UNITED STATES PATENT OFFICE.

CARL STRAUB, OF SYRACUSE, NEW YORK.

WALL-COVERING COMPOSITION.

SPECIFICATION forming part of Letters Patent No. 382,740, dated May 15, 1888.

Application filed February 8, 1887. Serial No. 226,945. (No specimens.)

*To all whom it may concern:*

Be it known that I, CARL STRAUB, of Syracuse, in the county of Onondaga and State of New York, have invented a new and Improved Wall-Covering Composition, of which the following is a full, clear, and exact specification.

This invention relates to a composition of matter that is more especially applicable for use as a substitute for the ordinary form of mortar, which ordinary form of mortar is, as is well known, open to many serious objections, among which are the following: Lack of cohesion, to overcome which hair is mixed into the mortar; lack of adhesion to the walls to be covered by the mortar, inequality of density and insufficient hardness, and then, too, great attention must be given in working the ordinary form of mortar to the state of the surrounding atmosphere, the temperature and the humidity of such atmosphere forming important factors in the successful manipulation of the mortar. To avoid all these difficulties and at the same time to materially cheapen the covering substance, I have devised the composition forming the subject matter of this application, the ingredients of my composition being of such a character that the composition itself is only about half as heavy as mortar; but it is more elastic, and is of a uniform density or hardness.

In compounding my composition I take vegetable fiber, preferably sawdust, which may be colored or uncolored, and mix this fiber in a proper receptacle with muriatic acid and water, the acid and water being combined in the proportions of one part of acid to from thirty to sixty parts of water; or, instead of muriatic acid, I could use sulphuric acid, or the two acids might be combined; or, instead of the acid, silica of potash or natron could be used, the parts being mixed, as above stated, with water. If acid is used and it is desired to have the material harden quickly, the proportion of acid would be increased, and vice versa. After the vegetable fiber has been treated as described it is dried, and after being dried it is mixed with mineral cement, any proper form of mineral cement being applicable for use in this connection; but in practice I would prefer to use the material described in Letters Patent No. 353,896, granted to me on the 7th day of December, 1886; but Portland cement, water-lime, or, as before stated, any proper cement could be used. In combining the dry vegetable fiber with the cement care must be taken to thoroughly mix the two ingredients, after which the mixed ingredients may be packed for transportation and are in condition for immediate use, the material being applied by mixing it with water until a thick paste is obtained, which should be thoroughly stirred, and which may be applied upon the backing of stone, brick, wood, or any other proper backing in the same way as common plaster or mortar is applied, a good finish and surface being obtained without much difficulty or work.

When the background to which the composition is applied is made of brick, stone, or lath, it would not be necessary to impregnate the vegetable fiber with acids.

Having thus fully described my invention, I claim as new and desire to secure by Letters Patent—

1. The covering composition consisting of wood fiber, cement, and a hardening-acid, substantially as set forth.

2. The covering composition consisting of wood fiber, sawdust, mineral cement, and muriatic and sulphuric acid, substantially as described.

CARL STRAUB.

Witnesses:
SAMUEL S. RUSTON,
T. S. TRUAIR.